United States Patent [19]

Allen

[11] 4,245,264
[45] Jan. 13, 1981

[54] APPARATUS AND METHOD FOR DIGITALLY SYNCHRONIZING THE TIMING OF A SEQUENCE OF ELECTRICAL OUTPUT PULSES IN ACCORDANCE WITH A SELECTABLE, PERMISSABLY NON-LINEAR FUNCTION OF THE TIMING OF A SEQUENCE OF ELECTRICAL INPUT PULSES

[75] Inventor: David M. Allen, Overland Park, Kans.

[73] Assignee: Control Systems, Inc., Kansas City, Kans.

[21] Appl. No.: 58,906

[22] Filed: Jul. 19, 1979

[51] Int. Cl.$^3$ ............................................. G11B 5/09
[52] U.S. Cl. ....................................... 360/51; 360/45
[58] Field of Search .......................... 360/39, 45, 51

[56] References Cited

U.S. PATENT DOCUMENTS

| 4,008,488 | 2/1977 | Osborne | 360/51 |
| 4,146,743 | 3/1979 | Raynham | 360/51 |

Primary Examiner—Vincent P. Janney
Attorney, Agent, or Firm—Schmidt, Johnson, Hovey & Williams

[57] ABSTRACT

A method and apparatus for implementing the same are provided for digitally synchronizing the timing of a sequence of electrical output pulses in accordance with a selectable, permissably non-linear function of the timing of a sequence of electrical input pulses. The method and apparatus are illustrated with reference to application thereof to overcoming the problem of degradation of synchronization caused by so-called "peak shift" due to the adjacent data effect in the reading of binary data stored on magnetic disks or the like. Pulses of a timing reference signal having a uniform interval equal to a sub-multiple of the normal average interval of the desired output pulses are continuously counted to a number base equal to the denominator of said sub-multiple, and output pulses are produced whenever a preselected count value occurs. Output pulse timing correction values in accordance with the synchronizing function selected are stored in memory. A parameter of the input pulse sequence representing the occurrence of a new pulse therein is sensed and triggers substitution for the then existing count of the correction value accessed from memory at the address represented by the count existing prior to such substitution. Accurate synchronization of the timing of the output pulses with the actual, leading or lagging occurrence of input pulses is thereby accomplished on a continuing basis whenever a new input pulse produces the mentioned triggering, even with input pulse sequences from which only irregularly occurring, magnetic state transition boundaries may be sensed.

16 Claims, 3 Drawing Figures

APPARATUS AND METHOD FOR DIGITALLY SYNCHRONIZING THE TIMING OF A SEQUENCE OF ELECTRICAL OUTPUT PULSES IN ACCORDANCE WITH A SELECTABLE, PERMISSABLY NON-LINEAR FUNCTION OF THE TIMING OF A SEQUENCE OF ELECTRICAL INPUT PULSES

BACKGROUND OF THE INVENTION

1. Field of the Invention

This invention relates to electronic methodology and apparatus for synchronizing the timing of a sequence of electrical output pulses with a sequence of electrical input pulses in accordance with a desired correlation therebetween. More particularly, the invention is concerned with making it possible and practicable to accomplish such synchronization in accordance with virtually any linear, non-linear or empirical correlation function, which it may be appropriate to select for any given purpose.

Still more specifically, the preferred embodiment of the invention chosen as a basis for illustrating and explaining the application of its principles to an area of technology where it is especially needed at this time is concerned with providing a significantly improved technique and system for more accurately reading binary data from magnetic disk devices and the like.

In the last-mentioned context, I have found a specific correlation function which I prefer to employ for that particular application, and it is noted hereinafter. However, it should be understood at the outset that, neither in the more restricted context of application to the reading of binary data from magnetic storage media, nor in its more general context, is the invention primarily directed or essentially limited to any particular correlation function. Rather, the invention is concerned with providing a method and apparatus by which substantially any selected correlation function of whatever nature can be accurately, reliably and economically applied in the synchronization of sequences of electrical pulses in any manner selected as useful for any particular purpose.

2. Description of the Prior Art

In general, the classical approach to synchronizing the frequency of one alternating current signal with another has involved the employment of analog type circuitry arrangements of various kinds, often referred to as "phase locked loops," in which differences in frequency or phase of the output signal from a reference input signal are sensed and "fed back" in some suitable manner to the source of the output signal to alter its frequency or phase so as to bring it in to conformity or synchronization with the reference input signal, the kind of correlation most typically sought in such instances being simply full correspondence between output and reference inputs. The same sort of analog techniques have been attempted with pulse type signals in certain applications, but with less than fully satisfactory results, particularly when the desired output signal is to be correlated with the input signal in some manner other than merely direct correspondence therebetween.

Various digital techniques (and hybrid digital and analog arrangements) have also been proposed for use in synchronizing pulse sequence type signals; for example, see: U.S. Pat. Nos. 3,364,439 of Cohen et al, 3,931,585 of Barker et al, 3,936,762 of Cox et al, and 3,983,497 of Malek. However, such prior digital systems have essentially been based upon integer divisions of frequency, perhaps with alteration of the divisor, and have each been subject to one or more of a number of disadvantages or limitations, such as requiring complex and expensive, hard-wired logic circuits, inherent inability to realize any but a restricted class of correlation functions, inherent inability (at least without substantial modification) to function with various types of commonly occurring and commercially related input signals (such as derivable from the different species of encoding schemes used to record binary data on magnetic disks), inherent inability or impracticality for keying synchronization to an input having a varying frequency or irregularly occurring pulses (such as the pulse sequence derivable from the sensing of magnetic state transition boundaries during reading of binary data stored on a disk device), etc.

I am not aware of anyone having previously taught or employed the straigtforward, reliable, accurate, economical and, perhaps retrospectively, simple approach to providing a generalized solution to the problem of synchronizing pulse type signals in accordance with virtually any selected linear or non-linear correlation function, as achieved by my invention and hereinafter described.

SUMMARY OF THE INVENTION

The improved pulse signal synchronizing method provided by this invention involves digitally and cyclically counting, to a number base equal to a selected integer, the uniformly spaced pulses of a time reference signal having a pulse repetition rate equal to the same integer multiple of the expected average repetition rate of pulses in the desired output signal; timing correction values predetermined in accordance with a selected correlation function are stored in memory; the particular timing correction value stored at the address in memory corresponding to the then existing count is accessed and substituted for such previously existing count upon each occurrence of a pulse in an input signal to which synchronization is to be effected, and the counting is continued from such substituted correction value; and a pulse of the output signal is produced whenever the count becomes a predetermined value. In the application of the invention to the synchronization of a clocking output signal for the reading of successive bits of binary data recorded in a serial bit string on a magnetic medium with the timing exhibited by the sense or polarity transitions actually occurring in the data being read, the count selected for producing output pulses will be chosen with a view to "centering" the information accepted as the reading for each data bit relative to the duration of sensing of information representing such bit.

The improved pulse signal synchronization apparatus provided by the invention employs an oscillator and pulse shaping means for generating a pulse type time reference signal; a solid state digital counter for counting the pulses of such time reference signal; a preferably PROM or ROM type solid state memory for storing correction values determined by the correlation function selected; connections from the counter to the memory for addressing particular correction values according to the count then existing in the counter; connections from the memory to the counter for accessing from memory a particular correction value so addressed by the counter and delivering the same to the data in or preset terminals of the counter; means for sensing the occurrence of pulses or other parameter changes in an input signal; connections from the sensing means to the counter to actuate the latter to load as a new substituted count therein a correction value so accessed and delivered from the memory; and means for detecting coincidence of the count with a preselected value and producing an output pulse in response to each such preselected value. In the application of the invention to the serial reading of a sequence of binary bits magnetically recorded on a disk device or the like, the input signal is derived from the sense or polarity transitions occurring in the data being sensed by a pick-up head associated with storage medium, and the output pulse signal is utilized for clocking the acceptance of information from the input signal stream for determining the value read for each successive bit at a time when the pick-up head is substantially "centered" with respect to the zone of the storage medium within which such bit is magnetically recorded.

Both the method and apparatus of the invention are characterized by their versatile adaptability for use in accurately and economically accomplishing reliable pulse signal synchronization in accordance with virtually any type of correlation function that may be selected for diverse particular applications.

DESCRIPTION OF THE PREFERRED EMBODIMENTS

It is believed that the nature and advantages of the invention, both in its broader and its more specific aspects, can be best understood and appreciated, if some further background consideration is initially given to one particular, but typical, environment for application of the invention. A convenient context for that purpose, as well as for providing an applicational frame of reference for subsequently describing actual embodiments of the invention, is presented by equipment for reading binary data from magnetic storage disks or the like, an application for which the invention is sorely needed—and increasingly so as recording densities and rotational speeds are increased.

Figure 1:
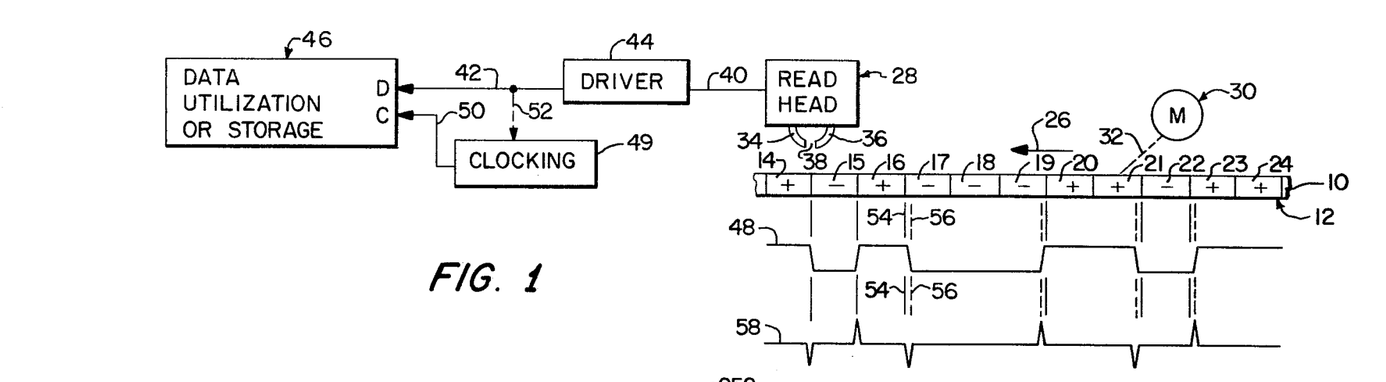
FIG. 1 is an electrical block and mechanical schematic diagram, including certain waveforms, referred to hereinafter to facilitate explanation of the applicational environment with respect to which the invention will then be described in greater detail.

Accordingly, reference is first made to FIG. 1 for facilitating visualization, as needed, wherein a data track 10 of a magnetic data storage disk 12 is shown as including a plurality of contiguous zones 14–24 inclusive, within each of which one bit of binary data is magnetically recorded in one or the other of a pair of senses or polarities respectively represented in the drawing by plus and minus signs therein. The disk or other magnetic data recording medium 10 is continually moved at relatively high speed in the direction indicated by the arrow 26 relative to a magnetic pick-up or read head assembly 28, by means of an electric motor 30 operably coupled with the disk or medium 10 as indicated by the dotted line 32. The read head 28 is typically provided with sensing elements 34 and 36 presenting a gap 38 therebetween, which is juxtaposed in close proximity to the track 10 so as to successively encounter the zones 14, 15, 16 et seq. in that order as the motor 30 rotates the disk 12 to move the data track 10 in the direction 26. As the gap 38 passes over a particular one of the zones 14, 15, 16 et seq. it senses the polarity of the data bit recorded in such zone, which is typically then passed along a circuit path 40 and 42 including appropriate driver circuitry 44 to the data input terminal D of some form of data utilization or storage device 46, for example, a shift register. The general nature of the wave form of the signal produced by the read head 28, after shaping, and as delivered as an input to the data terminal D of the device 46 is depicted at 48, from which it will be observed that such input will follow the polarity of the particular information recorded in the successive zones 14, 15, 16 et seq. and will manifest a corresponding change of level whenever the read head 28 is juxtaposed with and sensing an area of the track 10 at which a transition of polarity between contiguous ones of the zones 14, 15, 16 et seq. occurs. Such input signal 48, therefore, may be thought of as in the nature of a sequence of pulses, the durations of which are determined by the presence or absence of polarity transitions in between successive bit representing zones 14, 15, 16 et seq. It will also be observed that the upward and downward slopes of the input signal wave form 48, although having various spacings depending upon the location of occurrences of polarity transitions in the track 10, do nevertheless each generally align in time with the passage of a polarity transition in the track 10 through sensing relationship with the read head assembly 28.

It is inherent in such equipment, wherein the data carrying zones 14, 15, 16 et seq. are individually quite minute and passing under the sensing gap 38 of the read head assembly 28 in typically a matter of a few microseconds for each, that the most reliable sensing or reading of the bit information recorded in each particular zone is obtained, if such "reading" is taken at a time when the gap 38 is essentially centered with respect to the particular one of the zones 14, 15, 16 et seq. for which the sensing information is to be accepted as the "reading" for the corresponding bit. As the relationship between the sensing gap 38 becomes less centered relative to the zone 14 et seq. from which it is sensing the polarity state of the information magnetically recorded on the track 10, the accuracy of such information tends to become increasingly ambiguous as a contiguous zone involving a polarity transition is approached, and, of course, reliability is completely lost and an erroneous "reading" may be sensed when the gap 38 is juxtaposed so that the sensitivity of the read head 28 is directed toward a polarity transition between a pair of contiguous zones, or even toward the "wrong" zone, of the track 10.

Any such erroneous reading or "skipping" of a zone of the track 10 will result in serious inaccuracies in the string of "0" or "1" binary bit values representing the data to be read. Accordingly, it is customary to provide a clocking output signal to the clock, latching or triggering terminal C of the data utilization or storage device 46 to admit or accept the input data being read by the read head assembly 28 only during periods such that the gap 38 of the read head assembly 28 would be expected to be juxtaposed in essentially centered relationship with the particular zone 14, 15, 16 et seq. then passing thereunder and being read.

In FIG. 1, a clocking output pulse generator is indicated at 48 and is coupled with the clocking terminal C of device 46 as at 50. It might seem at first blush that, as the motor 30 drives the medium 10 at a constant and known rate of speed, then the zones 14, 15, 16 et seq. should pass under the gap 38 of the read head assembly 28 at uniform intervals, and it should be possible to provide appropriate clocking output signals to the device 46 for accomplishing read operations upon the zones 14, 15, 16 et seq. at times such that the sensing gap 38 would be appropriately centered with respect thereto merely by employing a clocking pulse generator 48 of appropriate frequency and precision. However, despite great efforts to maintain the motion of the disk 12 relative to the read head assembly 28 as uniform as feasible, it has proved commercially impracticable to maintain absolute uniformity of the speed of movement of the medium 12, and it is also the case that individual ones of the zones 14, 15, 16 et seq. may be of somewhat differing lengths or relative positioning along the path of travel of the track 10 due to lack of uniform motion of the disk while the information was being recorded onto the track 10 thereof or for other reasons. In any event, it has been recognized that the mere provision of some means 48 for generating a precisely timed pulse output signal of known and constant frequency for purposes of clocking a utilization or storage device 46 is inadequate for achieving accurate and reliable reading of binary data recorded in successive bit representing zones of a track 10 on a moving magnetic storage medium 12, and this is especially the case with disk storage devices of the so-called "floppy disk" and "mini-disk" varieties that are coming into ever increasing commercial use by virtue of their economical construction, which is unfortunately attended by often significant departures from uniformity in the rate of rotation of the disk 12.

It has been recognized, therefore, that the clocking pulse output applied to the clocking terminal C of the device 46 needs to be maintained in appropriate synchronization with the input signal being derived from the track 10 by the read head assembly 28. In theory, of course, a satisfactory source of clocking pulse signals could be provided by dedicating a second track (not shown) parallel (in an arcuate sense) to the track 10 on the disk 12, recording appropriate clock pulse producing information in such second track, and then merely reading such clock pulse information by a second read head assembly (not shown) and applying it to the clocking terminal C of the device 46 along with the data information input being concurrently applied to the data terminal D of such device 46. However, the economic and operational practicalities of needling all available space on a given magnetic storage medium 12 for the recording of data information, again particularly on the newer smaller forms of disk medium 12, discourage that approach from being employed for most applications involving currently prevalent forms of rotating, magnetic, data storage systems.

Those working in this art, therefore, have recognized the need for some satisfactory form of synchronizing coupling, functionally indicated by the dotted line 52 in FIG. 1, of the input signal being received from the read head assembly 28 from its sensings of the data information recorded in the track 10 with the clocking pulse source 49 so that the output signal from the latter may be maintained in proper correlation with the passage of the zones 14, 15, 16 et seq. beneath the sensing gap 38 of the read head assembly 28, in order to provide "centered" and reliable readings of the bit data from each of the zones 14, 15, 16 eq seq. Again at first blush, it might seem that all that would be required would be to sense each polarity transition point along the track 10 as it passes under the gap 38 and appears in time-wise orientation within the input signal, and then to apply conventional frequency or phase synchronization techniques to appropriately alter the frequency of the clocking output signal being produced by the clocking pulse generator 49. Unfortunately, that technique will not suffice to maintain the accurate "centered" reading of bit data, because of what broadly involves lack of even integer multiple related uniformity of the intervals between polarity referencing slopes in the input signal actually derived by the read head assembly 28 from the track 10, and which is a narrower context specific to the application under consideration, is due to an effect commercially known as "peak shift" which is inherent in the serial reading of a succession of contiguous zones of magnetically recorded binary data information in which polarity reversals may occur more or less irregularly along the length of the recording track depending upon the binary representations of the data recorded.

The mentioned "peak shift" effect essentially involves the apparent expansion of a zone containing magnetically recorded information of one polarity when such zone is adjacent to a greater number of zones of the opposite polarity. Such expansion effect is indicated in FIG. 1, for example, with respect to the trailing edge of the zone 16, wherein the actual physical polarity transition boundary between the zones 16 and 17 is identified by a line 54, while the apparent location of such polarity transition as actually sensed by the read head assembly 28 is indicated by the dotted line 56, which is offset toward the dominating opposite polarity zones 17, 18 and 19. Such an effective expansion of the leading edge of the zone 20, and an expansion in both directions of the apparent or sensible extent of the zone 22 are also indicated in FIG. 1, it being understood, of course, that the representations of such effect in the drawing are intended for illustration rather than indicating scale. It will be further observed that the slopes of the input signal wave form 48 corresponding to polarity transitions in the track 10, as sensed by the read head assembly 28, are offset in time in a direction corresponding to the sense and magnitude of the "peak shift" effect. The electrical effect of such "peak shift" is even somewhat more apparent from a wave form 58 also included in FIG. 1 and depicting differentiation of the slopes of the wave form 48 into positive and negative pulses corresponding in time with the transitional slopes of the wave form 48. Although it might seem that, since the effective polarity transitions in the input stream produced by the read head assembly 2 apply just as much to the recorded data information as they do to any synchronization signal that might be derived from such input stream, it should be possible to employ a derived signal having a wave form comparable to that shown at 58 (or with all pulses converted to the same polarity) for purposes of adjusting the frequency of the clocking output from the generator 49. Upon trial of such technique or further reflection upon the logic of such approach, however, it should be apparent that such a scheme would be far from optimum and, in extreme cases, would be inoperable for its intended purpose. The reason for this is that, if the timing of the clocking output pulses from the generator 49 thereof is adjusted or synchronized with the timing of sensing by the read head assembly 28 of a "peak shift" displaying apparent polarity transition, e.g., as at 56, then the generator 49 will maintain such new "synchronized" frequency until another polarity transition is sensed and applied as a synchronizing adjustment, so that the offset in timing of the clocking output pulses initially attributable to the "peak shift" effect upon zone 16 will continue through those clocking output pulses generated for reading from not only the zone 17, but also whatever following zones such as 18 and 19 may contain recorded information of the same polarity. Even in cases where the amount of initial apparent displacement of a polarity transition due to "peak shift" may be insufficient to adversely affect the reading in the next following zone, the cumulative effect of the increased (or decreased) interval of subsequent clocking output pulses until another polarity transition occurs and can be sensed to readjust the synchronization may cause extreme loss of reliability or error in the data readings attempted for following cells of the same polarity such as 18 and 19.

In the application under consideration, therefore, the input derived by the read head assembly 28 from the data information recorded in the zones 14, 15, 16 et seq. of the track 10 is the only available signal source for deriving synchronization controlling information for the clocking output pulse generator 49, but the information derivable from such input signal is unsuitable for use in accomplishing functionally satisfactory synchronization when utilized in accordance with known prior techniques found operable in other applications where an input pulse signal of suitable "regularity" is available. Such situation points up the need for a synchronization method and apparatus that is capable of applying synchronization adjustments that are not necessarily related to the input signal to be synchronized with in a straightforward manner, but which rather may require the application of a special correlation function for accomplishing the desired synchronization, which function may turn out in particular applications to be nonlinear or even purely empirical. The situation just noted also points up the need for a method and apparatus for synchronizing with a pulse input signal of nature characterized by some peculiarity, such as that resulting from "peak shift" in the reading of binary data information magnetically recorded upon rotatable disks or the like.

Figure 2:
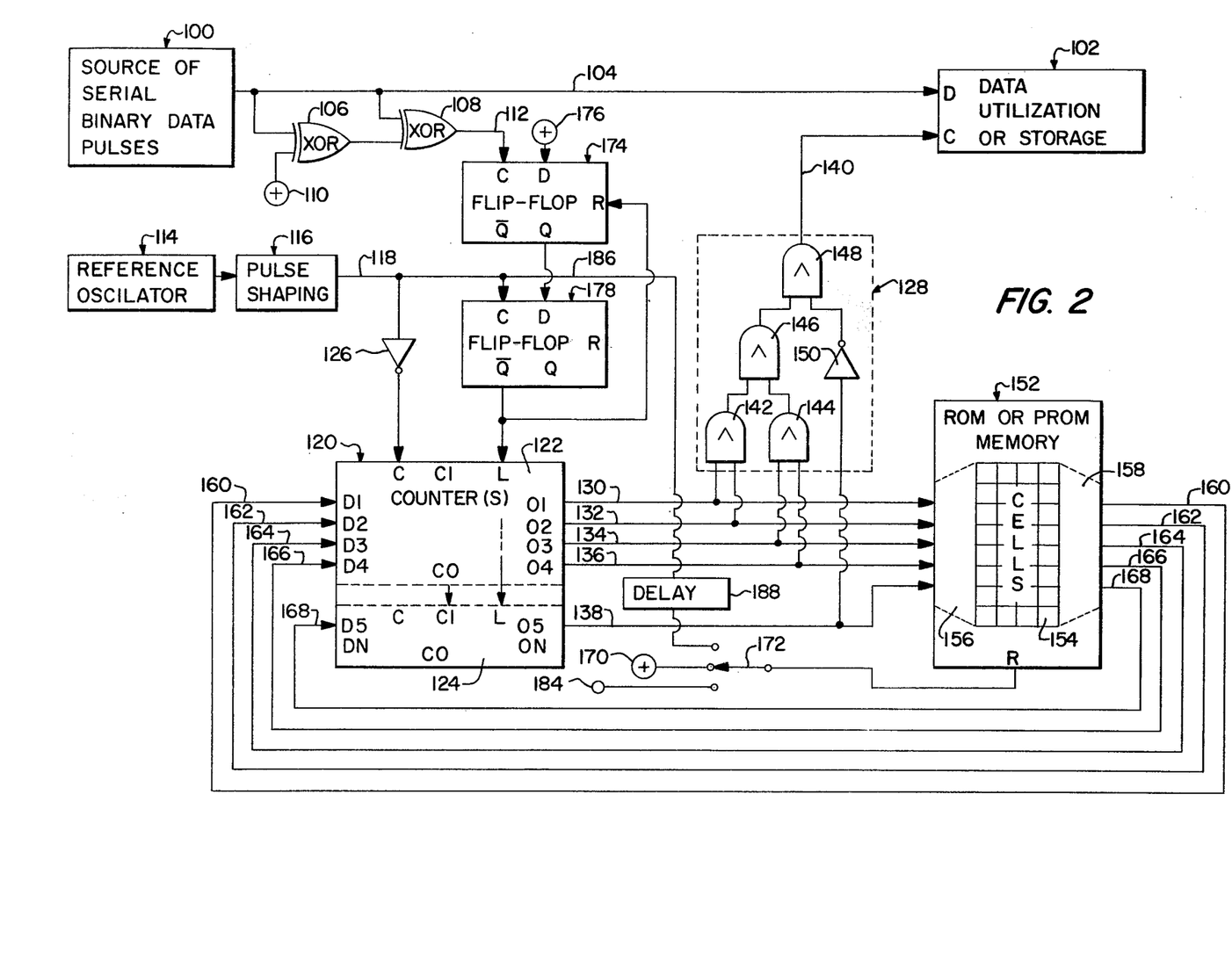
FIG. 2 is an electrical block diagram of the currently preferred embodiment of the apparatus of my invention, with certain optional features also depicted.

Referring now to FIG. 2, attention is next directed to the manner in which this invention answers the last-mentioned needs, both specifically by way of illustration with respect to systems for reading binary data from magnetic disks or the like and, thereby, more generally with respect to any pulse signal synchronization application in which a special, and perhaps non-linear or empirical, correlation function must be utilized, due to peculiarities of the input signal with which synchronization is required or other factors.

In FIG. 2, a source of serial binary data pulses is generally indicated at 100, and it will be understood could comprise the input signal derived by a read head assembly 28 from a track 10 of a magnetic disk or the like 12 during the serial reading of binary data magnetically recorded on the latter or, for example, an input signal from a communications system in which information is represented in binary form as a succession of pulses resulting from polarity or level transitions related to some underlying assumed, although perhaps imperfect, time base for purposes of identifying successively occurring information bits of the same sense or value not separated by state transitions, or, in general, from any of a broad class of pulse type input signals involving a train of pulses to which the timing of pulses in an output signal are to be synchronized.

The input signal from source 100 is electrically coupled with and applied to the data input terminal D of a data utilization or storage device 102 via a lead or other conductive path 104.

Depending upon the nature of the input signal available from the source 100 and the character of the parameter condition thereof whose occurrences are to be utilized as a basis for synchronizing another signal therewith in some selected manner, it will typically be necessary to provide some means for detecting occurrences of the signal parameter condition of the input signal which are of interest. For example, either positive going or negative going slopes of pulses may be sensed in known manner. In the application of the invention to a system for reading binary data from disk storage devices, however, both the positive going and the negative going slopes of the input signal from the source 100 are of interest, since both represent polarity transitions in the magnetically recorded data to be read; and both are utilized in the preferred embodiment, in order to provide more frequently occurring information keys for the up-dating of synchronization.

With the last-mentioned type of input signal, it will be understood that periods during which such signal is at a relatively more positive level may represent a binary value of "1" in the data being read, while periods during which such signal is at a relatively more negative level may represent a binary value of "0" in such data, (or vice versa). The first noted relationship between signal levels and binary value significance will be assumed for purposes of illustration and explanation herein. It should also probably be observed, in passing, that, although various encoding formats have been used for recording data on magnetic disks (as well as in data communications and other fields), which typically vary from each other primarily with respect to the inclusion or grouping arrangement of key bits with data information significant bits, since virtually all of such encodings reduce when serially sensed into a signal involving a succession of periods of alternately relatively more positive and relatively more negative level with transitions from one level to the other therebetween, this invention is compatible for use with most, if not all, of such encodings.

In order to detect both positive going and negative going transitions in the input signal, my preferred apparatus employs a pair of EXCLUSIVE OR logic gates 106 and 108. One input terminal of each of the gates 106 and 108 is coupled with the input signal lead 104, the other input terminal of the first gate 106 is coupled with a positive potential source 110 of level to represent a binary value of "1" to such input terminal of the gate 106, and the output from gate 106 is coupled with the other terminal of the second gate 108.

As those skilled in logic circuitry will recognize, when the level of the input signal upon lead 104 is relatively positive to represent a binary value of "1", a binary "1" will be presented to both input terminals of the gate 106, which will then present a signal level representing a binary value of "0" at the output terminal of the gate 106 and thereby at one of the input terminals of the gate 108; since the other input terminal of the gate 108 will be concurrently receiving a binary "1" from the input signal upon lead 104, however, the gating conditions required by an EXCLUSIVE OR gate are satisfied for the gate 108 to present at its output terminal a signal representing a binary value of "1". Similarly, when the level of the input signal upon lead 104 is relatively negative to represent a binary value of "0", the signal applied to the input terminal of the gate 106 coupled with the lead 104 will represent a binary value of "0", and the gating conditions will be satisfied for the gate 106 to present at its output terminal a signal representing a binary value of "1", which is also applied to one input terminal of the gate 108; concurrently, however, the other input terminal of the gate 108 will be receiving a signal representing a binary value of "0" from the input signal upon lead 104, which also satisfies the gating conditions for the gate 108 and causes the latter to present at its output terminal a signal having a binary value of "1" at its output terminal. Thus a steady state level of the input signal upon lead 104 representing either a binary "0" or a binary "1" will result in a relatively positive level of the output delivered by the gate 108 to lead 112 coupled with its output terminal. However, at the time of a level transition in either direction of the input signal upon the lead 104, the gate delays inherent in the gates 106 and 108 will cause the output from gate 108 to lead 112 to briefly drop to a low level. This provides upon the lead 112 representing the output from the detection gates 107 and 108 a signal characterized by a succession of relatively narrow, negative going pulses occurring in time coincidence with a transition in either direction of the level of the input signal upon lead 104. Attention will be returned to how such transition representing signal delivered to lead 112 is utilized as a key to synchronization of another signal with the input signal upon lead 104 after certain other portions of the synchronization system are identified.

A time base reference signal generator is provided by an oscillator 114 coupled through appropriate pulse shaping circuitry 116 with an output lead 118. For considerations of stability, the oscillator 114 will preferably be implemented as a crystal controlled oscillator of any conventional type, and it will be understood that the pulse shaping circuitry 116 merely converts the typically sine wave output from the oscillator 114 into suitable pulse signal form before delivering the same to the output lead 118. With virtually every input signal to which another signal is to be synchronized, the particular application involved will define some expected approximate average frequency or repetition rate at which data information should be successively accepted at the data input terminal D of the utilization device 102. For example, the speed of rotation of a magnetic data storage disk 12 past a read head assembly 28 in conjunction with the number of bit zones 14, 15, et seq. provided in a circular track 10 (or, equivalently, the design "length" of each such zone) will define an expected approximate repetition rate at which a clocking signal should be applied to the clocking input terminal C of the device 102 in order for the latter to accept information corresponding to one data bit during the scanning of each of the zones 14, 15, 16 et seq. by the read head assembly 28. Although short variations in the actual speed rotation of the disk 12 or apparent displacements of the zones of the track 10 attributable to the "peak shift" effect may cause the optimum times for reading individual bits to deviate in either direction from the exact intervals therebetween that would be implied from such expected, approximate repetition rate, those times and the intervals therebetween will tend over any appreciable period toward averaging out to what would be implied from such expected average repetition rate. In any event the selection of a reasonably appropriate expected average repetition rate for the clocking signals to be applied to the clocking terminal C of the device 102 is a logical starting point to be employed in design in selecting the frequency for the oscillator 114, with a view to restricting the synchronization adjustments to be made to less than the equivalent of one full interval of the time that would be required for the scanning of one bit containing zone of the track 10. A second design decision to be made in choosing the frequency for the oscillator 114 is the number of times during the course of one interval of the expected average repetition rate at which a synchronization adjustment capability is to be provided. In my preferred form of apparatus for use in a system for reading binary data from a magnetic storage disk, I have found that 32 of such points during each expected average interval is quite satisfactory. For reasons which will subsequently become apparent, the integer selected for this purpose preferably will be a power of 2. Accordingly, the frequency employed for the oscillator 114 for such application is 32 times the predetermined, expected, average repetition rate anticipated as required for the clocking pulses to be provided for synchronization purposes to the clocking input terminal C of the device 102. For example, this translates to a preferred frequency for the oscillator 114 of 9.14285 MH for reading Group Code Recording type binary bit data from a 5¼ inch magnetic storage "diskette" of standard double density mounted on a Shugart Model SA-400 or other standard disk drive, or of 18.2857 MH for reading such data from a standard 8 inch "floppy disk" mounted on a standard drive, or of 16.0 MH for FM or MFM formatted data from a 5¼ inch "diskette", etc. The pulse shaping circuitry 116 is preferably such as to present to the lead 118 a substantially square wave signal of the same frequency or repetition rate as the oscillator 114, which it will be understood, with the multiple of 32 selected for the illustrative application being discussed, will provide 32 pulses during the expected average interval required for the scanning of each bit zone of the track 10.

The time reference signal pulses on lead 118 are digitally counted, to the same numeric modulus as employed for the integer multiplier used in selecting the frequency for the oscillator 114, by means of a binary counter 120. In the example being discussed as illustrative, therefore, the counter 120 must handle 32 count values (from 0 through 31 inclusive, with return to 0 after 31), and may be conveniently implemented in solid state, integrated circuit componentry by a pair of intercoupled type SN74161 synchronous 4-bit binary counter chips 122 and 124, such as available from Texas Instruments Incorporated and others. Each of the counter sections 122 and 124 a count clocking terminal C, a carry out terminal CO, a carry in terminal CI, four count bit output terminal (designated 01, 02, 03 and 04 in section 122 and respectively representing additive binary count value components of 1, 2, 4 and 8; and only one of which, designated 05 and representing an additive binary count value component of 16, is utilized in section 124), four "preset" data input terminals (designated D1, D2, D3 and D4 in section 122 and respectively representing additive binary count value components of 1, 2, 4 and 8; and only one of which, designated D5 and representing an additive binary count value component of 16, is utilized in section 124), and a "preset" data load terminal L. The carry out terminal CO of the section 122 is coupled to the carry in terminal CI of the section 124, and the data load terminals L of the sections 122 and 124 are coupled together. Since it is desirable that a possible data load operation for substituting an adjusted count for the existing one be triggered simultaneously with a normal count incrementing operation (so that the former may override the latter), as hereinafter explained, the count incrementing clock terminal C of the counter section 122 is coupled with the lead 118 through an inverter 126, which causes both of such operations to be triggered by the same edge of a time reference signal pulse from lead 118 (i.e., from the positive going edge of an inverted or complimented time reference signal pulse). Upon each such triggering of clock terminal C of counter section 122 by successive time reference signal pulses, the binary count value presented at count output terminals 01 through 05 of the counter 120 is incremented by 1, so as to repetitively cycle through count values from 0 to 31 (unless and until a data load operation may occur, as hereinafter explained.

Once synchronization is established, each occurrence of a count value of 0 at the count output terminals 01 through 05 of the counter 20 will substantially coincide with the commencement of a new bit representing interval of the data input signal upon lead 104 or, in the illustrative application being referred to, with the commencement of scanning of a new bit zone of the magnetically recorded data track 10 by the read head assembly 28. Since in such application it is desired to accept information from the data input signal on lead 104 as representing the value of the recorded bit being read at a time when the read head assembly 28 is substantially "centered" with respect to the bit zone of track 10 then being scanned, it is appropriate to preselect the occurrence of a count value of 15 at the output terminals 01 through 05 of the counter 120 as determining the time when a data read or acceptance clocking output signal pulse should be applied to the clock terminal C of the data utilization device 102 for each bit of the data input signal presented to the data input terminal D of the device 102. For such purpose, a decoding logic network 128 is coupled with leads 130, 132, 134, 136 and 138 in turn respectively coupled with the count output terminals 01, 02, 03, 04 and 05 of the counter 120, so as to receive as inputs from the latter on a continuing basis the values of the various bits of the then existing count, and the network 128 is provided with an output terminal coupled by a lead 140 with the clock terminal C of the data utilization device 102. The network 128 may be realized in various conventional ways known to those skilled in the art (and may even be derived from logic available in another component of the system); for illustration, however, the network 128 may be implemented by AND gates 142, 144, 146 and 148 and an inverter or binary value complementer 150 interconnected in the manner shown in FIG. 2, which will produce a clocking output pulse on the lead 140 whenever, but only when, the binary values of the signals on the count value output leads are all equal to 1 and thereby represent a total existing count value of 15. When a different count value than 15 is selected for a particular application, an appropriately modified network 128 may be readily implemented by those skilled in the art for producing output pulses for clocking or other purposes upon the lead 140 in response to occurrences of such different selected count value.

It may be helpful to observe at this point that the portions of the system of FIG. 2 thus far described could effectively function to "center" the period of acceptance of information from the input signal upon the lead 104 as representing the data read for individual bits, with respect to the total duration of the information available in such input signal relating to such bits, only if the duration of information in the input signal relating to every bit was absolutely equal, the repetition rate for the intervals of the input signal relating to individual data bits remained absolutely constant and exactly equal to the predicted average repetition rate thereof, and the oscillator 114 was somehow brought into and maintained in exact synchronization with the input signal in such manner that a count value of 0 at the counter 120 would always precisely coincide with the commencement of an interval of the input signal relating to a corresponding bit to be read. For the reasons previously discussed, it is believed apparent that such conditions are not practically attainable. Moreover, it should now be more clear why something more sophisticated than a simple time division or the like is required as the correlation function for effective synchronization with signals having peculiarities and irregularities such as those inherently involved in applications such as providing clocking pulses for the reliable and accurate reading of binary data from a disk storage device or the like.

It may next be appropriately noted, therefore, that my method and apparatus employ a data storage memory 152 having a plurality of individually addressable data storage cells 154 (sufficient in number to provide one such cell 154 for each value which the selected modulus for the count output from the counter 120 may assume), address decoding and driver circuitry 156 to which a binary address may be input for selecting a cell 154 whose stored data is to be accessed, output circuitry 158 for delivering the data from an accessed cell 154 to output lines in binary form, and a read enable terminal R. It should be understood that the memory 152 may be entirely conventional in construction and preferably is in the nature of a PROM or ROM type memory module in which selected data may be essentially permanently stored and from which such data may be addressably accessed, such modules being commercially available from many sources (for example, the National Semiconductor type 74S288). For the application being described for illustrative purposes, wherein the count value range of the counter 120 is from 0 to 31, it is sufficient for the memory 152 to provide 32 cells 154 each capable of storing 5-bit binary data and individually accessable with a 5-bit binary address. The count value bit output leads 130, 132, 134, 136 and 138 from the counter 120 are coupled with corresponding address bit input terminals of the addressing and driver circuitry portion 156 of the memory 152, and the bit output terminals associated with the output circuitry portion 158 of the memory 152 are coupled by leads 160, 162, 164, 166 and 168 with the corresponding "preset" data input terminals D1, D2, D3, D4 and D5 of the counter 120. With a memory 152 of the PROM or ROM type, I prefer to couple the read enable terminal R of the memory 152 with ground or a suitable potential source 170, so that the address inputs being applied to the memory 152 by the leads 130, 132, 134, 136 and 138 of the counter 120 (which change with each incrementation or other alteration of the count value at the counter 120) will be accessing new cells 154 on a current on-going regular basis, and so that up-dated data from the cells 154 thus successively addressed will also be applied as an output to the leads 160, 162, 164, 166 and 168 (and thereby the data input leads D1, D2, D3, D4 and D5) on a current and continuing basis corresponding to the then existing count value at the counter 120. It is noted in passing that the read enable terminal R of the memory 152 is depicted in FIG. 2 as coupled with the potential source 170 through a selection switch 172, which it should be understood would be an unnecessary option when the memory 152 is implemented with most types of PROM or ROM modules as they would typically be employed in most applications, and that such option and certain associated circuitry is so depicted primarily to facilitate explanation hereinafter of a modified embodiment employing a RAM type memory (which may be desirable for certain applications).

The data values stored in the respective cells 154 of the memory 152 are correction values in the nature of adjusted count values to be substituted for the existing count value in the counter 120 in the manner, under the circumstances and for the purpose hereinafter noted. The particular correction values to be stored in the various cells are determined by the particular correlation function preselected as most appropriate for accomplishing the desired signal synchronization in each particular application. Since such values are simply numeric values in 5-bit binary form, however, it will be recognized that virtually any needed correlation function, whether linear, nonlinear or purely empirical, can be employed with equal facility with my method and apparatus. As an example, my preferred set of correction values corresponding to each count value of the counter 120 for synchronizing the read clocking pulses in a system for serially reading bit data recorded on a typical magnetic storage disk, when using a count value modulus of 32, are as follows:

| Existing Count at Counter 120 | Correction Value in Corresponding Memory Cell 154 |
|---|---|
| 0 | 1 |
| 1 | 1 |
| 2 | 2 |
| 3 | 2 |
| 4 | 3 |
| 5 | 3 |
| 6 | 4 |
| 7 | 4 |
| 8 | 5 |
| 9 | 5 |
| 10 | 6 |
| 11 | 6 |
| 12 | 7 |
| 13 | 7 |
| 14 | 8 |
| 15 | 8 |
| 16 | 25 |
| 17 | 26 |
| 18 | 26 |
| 19 | 27 |
| 20 | 27 |
| 21 | 28 |
| 22 | 28 |
| 23 | 29 |
| 24 | 29 |
| 25 | 30 |
| 26 | 30 |
| 27 | 31 |
| 28 | 31 |

-continued

| Existing Count at Counter 120 | Correction Value in Corresponding Memory Cell 154 |
|---|---|
| 29 | 0 |
| 30 | 0 |
| 31 | 1 |

The correlation function implemented by the noted correction values are believed to achieve a near optimum compromise in providing synchronization for minimizing problems due to both "peak shift" and variations in the speed of rotation of the medium 12.

It should be apparent to those skilled in the art that, for an application requiring greater precision than afforded by a count modulus of 32 (which is quite adequate for the disk reading application chosen for illustration), a larger modulus may be employed with appropriate expansion of the capacities of the counter 120 and the memory 152 and a corresponding increase in the frequency of the oscillator 114.

Whatever the correlation function selected as appropriate for a particular application and the correction values determined by such function, it will thus far be understood that the applicable correction value corresponding to the then existing count value at the counter 120 will be continuously available on an up-dated basis at the "preset" data terminals D1, D2 et seq. of the latter and will be substituted for the then existing count value whenever a trigger signal is applied to the data load terminal L of the counter 120. It should be observed that such substitutions of correction values for the existing count value involve an adjustment or setting of the count to a new and usually non-zero value determined by the selected correlation function, rather than a resetting of the counter 120 to a 0 count in the usual sense. It remains to consider how the data load terminal L of the counter 120 is triggered and the significance of the timing of such triggering.

In such regard, attention is first returned to the detected transition representing signal derived from the data input signal and presented upon the lead 112, which it will be recalled has a waveform in the nature of relatively narrow, negative going pulses representing level transitions of the input signal upon lead 104 in either direction, separated by periods of more positive level and duration corresponding to the intervals between actual occurrences of level transitions in such input signal (transitions from a positive zone to a contiguous negative zone of the track 10, or vica versa, in the disk stored data reading application). Such transition representing signal is applied via lead 112 to the clock terminal C of a D-type edge-triggered flip-flop 174 also having a data terminal D, a noninverted output terminal Q, an inverted input terminal $\overline{Q}$, and a reset terminal R, which may be implemented as one-half of a dual flip-flop, integrated circuit chip such as type 7474 offered by various manufacturers. The data terminal D of the flip-flop 174 is tied to a positive potential source 176, so that the flip-flop 174 will be set and a positive level signal will be presented at the output terminal Q whenever a negative level trigger signal is first applied to the clock terminal C of the flip-flop 174, and such positive level signal at output terminal Q will then be maintained until the flip-flop 174 is reset as subsequently described. Thus, the persisting positive output presented at the terminal Q of the flip-flop 174 in response to each transition representing negative pulse of the signal on lead 112 may be considered as being in the nature of an enabling signal intiated by each level transition detected to have occurred in the input signal upon lead 104.

The last-mentioned positive enabling signal from terminal Q of the flip-flop 174 is applied to the data terminal D of a like flip-flop 178, whose clock terminal C is connected to the time reference signal lead 118 from the oscillator 114 and shaping circuit 116. The positive enabling signal from flip-flop 174 can, of course, not be accepted by the flip-flop 178 to set the latter until it is triggered by an appropriate clocking signal. However, the first negative going edge of the inverted time reference signal from lead 118 to occur triggers the flip-flop 178 into set condition, which produces a negative pulse at the inverting output terminal $\bar{Q}$ of the flip-flop 178. Such terminal $\bar{Q}$ is coupled with the data load terminal L of the counter 120, and the last-mentioned negative pulses output by the flip-flop 178 serve as trigger signals for causing the counter 120 to substitute the correction value then being applied to its data terminals D1, D2, D3, D4 and D5 for the then existing count value presented at its output terminals 01, 02, 03, 04 and 05 and thereby being applied to the decoding network 128 and the address input terminals of the memory 152.

Each such substitution of a correction value according to the preselected correlation function for the previously existing count value, following which incrementing of the count value by the counter 120 proceeds from the newly substituted correction value, serves to adjust the synchronization of the output signal on lead 140 with the input signal on lead 104 in accordance with such correlation function and in response to level transitions detected in the input signal upon lead 104.

The $\bar{Q}$ output terminal of the flip-flop 178 is also coupled with the reset terminal R of the flip-flop 174, so that the same negative pulses which trigger the data load and count value substitution operation in the counter 102 serve to reset the flip-flop 174. As soon as the negative clocking pulse of the inverted time reference signal from lead 118, which triggered the load and substitution operation of the counter 120, commences to go positive at its trailing edge, the flip-flop 178 also resets itself for lack of an appropriate clocking signal at its terminal C, assuring that the trigger signal applied to the load terminal L of the counter 120 will not extend beyond the length of one negative pulse portion of the inverted time reference signal from load 118.

It should be incidentally noted that the synchronous nature of the preferred form of counter 120 results in the skipping of one count value incrementation during each instance of a correction value being loaded and substituted for the previously existing count value. Accordingly, the correction values stored in the memory 152 should each be of magnitude one greater than would otherwise be the case, which may be regarded as merely another facet of the correlation function to be selected and, in any event, presents no problem since the correction values to be utilized may be of any magnitudes within the range provided by the capacities therefor implemented in the counter 120 and the memory 152.

It should now be appreciated that the method and apparatus of my invention provide a simple and economical way of accomplishing reliable signal synchronization with virtually any desired degree of accuracy of adjustment one may choose to implement and with unique flexibility as to the use of a selected correlation function best suited to the particular application involved.

Figure 3:
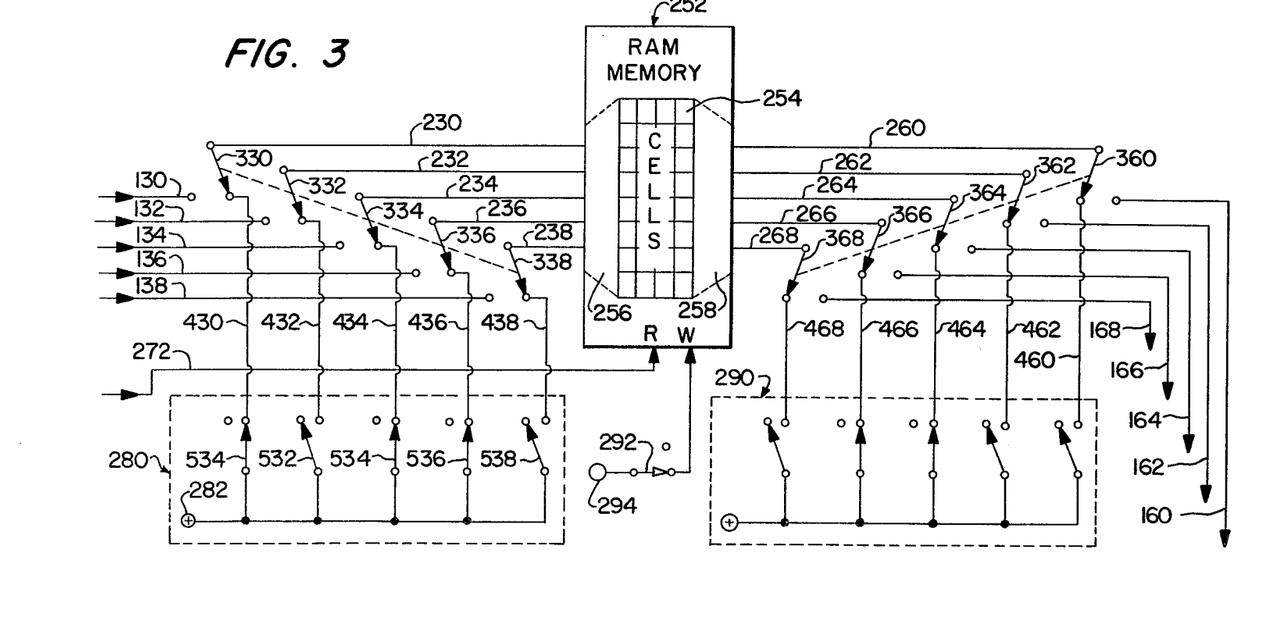
FIG. 3 is an electrical block diagram of a portion of my apparatus modified to employ a different type of memory.

There may be some applications for which it is desirable to be able to reaily change the selected correlation function and, accordingly, the correction values stored in memory, which would not be particularly convenient where PROM or ROM type memory is employed. FIG. 3 depicts a modification of the apparatus for such special applications utilizing a RAM type read-write memory 252, which may be of conventional commercial type. Parts in FIG. 3 numbered the same as parts in FIG. 2 should be understood as equivalent to the latter, and only those aspects of construction and operation of the modification of FIG. 3 which significantly differ from the construction and operation of the preferred embodiment of FIG. 2 will require further discussion. The address input portion 256 of the modified memory unit 252 will normally include a memory address register, as well as address decoding and driver circuitry. Similarly, the output portion 258 of the modified memory 252 will normally include a memory data register for either initially receiving data to be output from the cells 254 or initially recieving data to be stored into the cells 254, depending on whether the memory is in a read operation or a write operation mode. The memory 254 will, of course, include a write enable input terminal W as well as a read enable input terminal R.

The address input terminals of the portion 256 of memory 252, which will be coupled with the mentioned memory address register thereof, need to be able to receive addresses for the writing or storage into the cells 254 of a new set of correction values for implementing a different correlation function than previously stored therein, as well as for receiving addresses corresponding to count values from the counter 120 during normal signal synchronizing operation. Accordingly, leads 230, 232, 234, 236 and 238 respectively coupled with the address input terminals of the memory 252 are not connected directly with the leads 130, 132, 134, 136 and 138, but are rather respectively coupled with switching means 330, 332, 334, 336 and 338, by which the address leads 230 et seq. may be selectively coupled either with the output leads 130 et seq. from the counter 120 or with leads 430, 432, 434, 436 and 438 from an external address source generally designated 280. Although depicted for illustration as ganged mechanical switches, it will be understood that the switching means 230 et set. may be equivalently implemented electronically with appropriating gating components, if that is desirable. Similarly, although the external address source 280 is depicted for illustrative purposes as implemented by manually operable "bit switches" 530, 532, 534, 536 and 538, such as employed in many computer panels, for selectively coupling the leads 430 et seq. with a positive potential source 282, it will be apparent that the external bit coded address data to be applied to the leads 430 et seq. might equivalently be supplied from an associated computer or the like.

Also, with the read-write type memory 252, it will be necessary to provide for deenergizing the read enable terminal R during write operations, and it may also be desirable to provide for properly timed intermittent energizations of the read enable terminal R of the memory 252 (or even with the memory 152 of FIG. 2) rather than continuous energization thereof even during normal synchronizing operation. It is for these purposes that the optional switch 172 shown in FIG. 2 may be provided, and may be coupled with the read enable terminal R of the memory 252 via a lead 272. Besides the continuous energization position shown in FIG. 2, the switch 172 may connect the lead with an appropriate external read trigger signal source represented by a terminal 184 or with the time reference signal lead 118 via a lead 186 preferably include a delay element 188 for assuring that the current incrementation of the count value in the counter 120 will have been completed before a read operation of the memory 252 is initiated during normal synchronizing operation.

Although the circuitry portion 258 of the memory 252 and its memory data register function to output correction values from the cells during normal synchronizing operation, the same memory data register and some of its associated circuitry 258 would be used for inputing new correction values into the cells 254 when a different correlation function is to be introduced to the system for employment in subsequent synchronizing operations. Accordingly, the data terminals associated with the circuitry 258, rather than being directly coupled with the leads 160 et seq. going to the data input terminals D1 et seq. of the counter 120, will be coupled through leads 260, 262, 264, 266 and 268 with switches 360, 362, 364, 366 and 368 (which may be implemented in the same ways as previously described for the switches 330 et seq.). The switches 360 et seq. permit selective coupling of the leads 260 et seq. either with the leads 160 et seq. for normal synchronizing operation or with leads 460, 462, 464, 466 and 468 from an external data source 290 (which may be implemented in the same ways as previously described for the external address source 280).

The modified memory 252 will also require means for selectively energizing the write enable terminal W thereof, which may be implemented by either a mechanical switch or equivalent electronic gating 292 for connecting the terminal W with a positive potential source 294 when appropriate.

Those skilled in the art will perceive that employment of the modified, read-write type memory 252 adapts the invention for operation under programmed computer control, by which the correlation function being applied for synchronization purposes may be dynamically changed as needs, sensed external events or other factors may demand, which in turn would appear to invite utilization of the inventions for applications that have been heretofore insolvalbe or treatable only with much more complex and expensive techniques.

Since it will also be apparent to those skilled in the art that various minor alterations could be made in the currently preferred forms of my method and apparatus without departing from the gist and essence of my invention, it is to be understood that the invention should be deemed to be limited only by the fair scope of the claims which follow and to include equivalents thereof.

I claim:

1. In a method for serially reading binary bit data magnetically recorded along a data track upon a medium moving relative to a scanning read head assembly operable to provide an electrical input signal of changing level corresponding to the polarity of magnetic recording of data being sensed by said assembly into a clockable data utilization device, the steps of:
providing an electrical time reference signal comprising a sequence of pulses having a substantially constant repetition rate equal to a preselected integer multiple of the expected approximate average rate of scanning of successive bits of data along said track by said assembly;
digitally and cyclically counting the occurrence of said pulses of said time reference signal to a numeric modulus equal to said preselected integer multiple;
storing in accessable addressed memory digital correction values predetermined by a preselected correlation function for each possible value respectively of the count of occurrences of pulses of said time reference signal;
detecting the occurrence of each change of level of said input signal representing a transition in the polarity of magnetic recording of data being sensed by said assembly;
upon each said detection of the occurrence of such a change of level of said input signal, accessing from memory the correction value stored in memory at the address corresponding to the then existing value of said count, and substituting said accessed correction value for said then existing value of said count;
producing an output signal pulse whenever said count is of a preselected value; and
applying said output signal pulses to said data utilization device for clocking the latter in synchronization with said input signal according to said preselected correlation function.

2. In a method for producing an electrical output signal comprising a sequence of pulses having an expected approximate average repetition rate over a substantial period of time but successively occurring individually at controllably variable time intervals digitally synchronized in accordance with a preselected permissably non-linear correlation function to the times of occurrence of individual pulses of an electrical input signal permissably occurring at irregular intervals, the steps of:
providing an electrical time reference signal comprising a sequence of pulses having a substantially constant repetition rate equal to a preselected integer multiple of said expected average repetition rate of the pulses of said input signal;
digitally and cyclically counting the occurrence of pulses of said time reference signal to a numeric modulus equal to said preselected integer multiple;
storing in accessable addressed memory digital correction values predetermined by said preselected correlation function for each possible value respectively of the count of occurrences of pulses of said time reference signal;
upon the occurrence of each pulse of said input signal, accessing from memory the correction value stored in memory at the address corresponding to the then existing value of said count, and substituting said accessed correction value for said then existing value of said count; and
producing a pulse of said output signal whenever said count is of a preselected value.

3. In a method for synchronizing the occurrence of a predetermined change of a predetermined parameter of a first electrical signal with the occurrences of a predetermined change of a predetermined parameter of a second electrical signal in accordance with a preselected permissably non-linear correlation function, the steps of:

digitally and cyclically counting the occurrence of successive events of preselected type to a preselected numeric modulus;

storing in accessable addressable memory digital correction values predetermined by said preselected correlation function for each possible value respectively of the count of occurrences of said events;

detecting each occurrence of said predetermined change of said predetermined parameter of said second signal;

upon each said detection of the occurrence of such a change of said parameter of said second signal, accessing from memory the correction value stored in memory at the address corresponding to the then existing value of said count, and substituting said accessed correction value for said then existing value of said count; and producing an occurrence of said predetermined change of said parameter of said first signal whenever said count is of a preselected value.

4. In apparatus for serially reading binary bit data magnetically recorded along a data track upon a medium moving relative to a scanning read head assembly operable to provide an electrical input signal of changing level corresponding to the polarity of data being sensed by said assembly into the data input terminal of a clockable data utilization device also having a clocking input receiving terminal:

means for coupling said assembly with said data input terminal of said device for presenting said input signal to the latter;

means for generating an electrical time reference signal comprising a sequence of pulses having a substantially constant repetition rate equal to the expected approximate average rate of scanning of successive bits of data along said track by said assembly multiplied by a preselected integer;

digital counting means coupled with said generating means for continuously and cyclically counting the occurrence of said pulses of said time reference signal to a numeric modulus equal to said integer;

said counting means having count delivering terminals at which the currently existing count value is presented, data input terminals to which data representing a digital correction value comprising an adjusted count value may be applied, and an adjusted count value loading terminal for controlling substitution of said adjusted count value for said currently existing count value;

memory means having a plurality of addressable data storage cells as great as said integer, addressing input terminals coupled with said count delivering terminals of said counting means and data accessing terminals coupled with said data accessing terminals of said counting means, each of said cells respectively of said memory means having data representing a respective adjusted count value predetermined by a preselected correlation function stored therein, said data stored in each of said cells respectively being presentable at said accessing terminals for application to said data input terminals of said counting means when the address corresponding to said cell is applied to said addressing input terminals;

means coupled with said assembly for detecting changes of level in said input signal representing a transition in polarity between successive bits of data sensed by said assembly from said track, said detecting means being coupled with said adjusted count loading terminal of said counting means for delivering to the latter, upon the detection of each of said changes of level in said input signal, a control signal operable to cause said counting means to substitute the adjusted count value then being applied to said data input terminals of said counting means for the then currently existing count value; and means coupled with said count delivering terminals of said counting means and with said clocking input receiving terminal of said data utilization device for sensing whenever the count value presented at said count delivering terminals equals a preselected value and thereupon delivering a clocking input signal to said data utilization device to actuate the latter to accept the then existing state of said input signal presented to said data input terminal thereof as representing a data bit read by said assembly from said track.

5. In apparatus for producing an electrical output signal comprising a sequence of pulses having an expected approximate average repetition rate over a substantial period of time but successively occurring individually at controllably variable time intervals digitally synchronized in accordance with a preselected permissably non-linear correlation function to the times of occurrence of individual pulses of an electrical input signal permissably occurring at irregular intervals:

means for providing an electrical time reference signal comprising a sequence of pulses having a substantially constant repetition rate equal to a preselected integer multiple of said expected average repetition rate of the pulses of said input signal;

means coupled with said reference signal providing means for digitally and cyclically counting the occurrence of pulses of said time reference signal to a numeric modulus equal to said preselected integer multiple;

accessable addressed memory means for storing digital correction values predetermined by said preselected correlation function for each possible value respectively of the count of occurrences of pulses of said time reference signal;

means coupled with said memory means and said counting means and operable upon the occurrence of each pulse of said input signal for accessing from said memory means the correction value stored in said memory means at the address corresponding to the then existing value of said count, and for substituting said accessed correction value for said then existing value of said count in said counting means; and means for producing a pulse of said output signal whenever said count is of a preselected value.

6. In apparatus for synchronizing the occurrence of a predetermined change of a predetermined parameter of a first electrical signal with the occurrences of a predetermined change of a predetermined parameter of a second electrical signal in accordance with a preselected permissably non-linear correlation function:

means for digitally and cyclically counting the occurrence of successive events of preselected type to a preselected numeric modulus;

accessable addressed memory means for storing digital correction values predetermined by said preselected correlation function for each possible value respectively of the count of occurrences of said events;

means for detecting each occurrence of said predetermined change of said predetermined parameter of said second signal;

means intercoupling said detecting means, said counting means and said memory means and operable upon each said detection of the occurrence of such a change of said parameter of said second signal by said detecting means for accessing from said memory means the correction value stored in said memory means at the address corresponding to the then existing value of said count in said counting means and for substituting said accessed correction value for said then existing value of said count in said counting means; and means for producing an occurrence of said predetermined change of said parameter of said first signal whenever said count in said counting means is of a preselected value.

7. The invention as set forth in any of claims 4, 5 and 6, wherein:
said memory means is of the read only type.

8. The invention as set forth in any of claims 4, 5 and 6, wherein:
said memory means is of the read-write type.

9. The invention as set forth in claim 8, wherein:
there is provided switching means for selectively decoupling said memory means from said counting means and coupling said memory means with external sources of memory addressing values and digital correction values.

10. The invention as set forth in any of claims 4, 5 and 6, wherein:
said preselected value of said count is intermediate the extremes of possible values of said count.

11. In a method for producing an electrical output representing a preselected, permissably non-linear function of a pair of pulse type electrical inputs:
digitally and cyclically counting the occurrence of pulses of one of said inputs to a preselected integer numeric modulus;

storing in accessable addressed memory digital values predetermined by said function for each possible value of the count of occurrences of pulses of said one input;

upon the occurrence of each of at least certain pulses of the other of said inputs, accessing from memory the value stored at the address corresponding to the then existing value of said count and substituting said value accessed from memory for said existing count value; and sensing said count value as the basis for providing said output.

12. The invention as set forth in claim 11, wherein:
said sensed value for providing said output includes a plurality of electrical bit states together representing said sensed value in binary numeric form.

13. The invention as set forth in claim 12, wherein is included the step of:
translating said bit states into an electrical output in the form of a pulse signal in which the timing of pulses is dependent upon said bit states.

14. In apparatus for producing an electrical output representing a preselected, permissably non-linear function of a pair of pulse type electrical inputs:
electrical counter means for digitally and cyclically counting the occurrence of pulses in an electrical signal coupled therewith to a preselected integer numeric modulus;

means for electrically coupling one of said inputs with said counter means for said counting by the latter of electrical pulses occurring in said one input;

addressed memory means for storing in condition to be accessed electrically according to address digital values predetermined by said function for each possible value of the count by said counter means of occurrences of pulses of said one input;

means for electrically coupling said memory means with said counter means for accessing from said memory means the value stored at the address corresponding to the then existing value of said count in said counter means and substituting said value accessed from said memory means for said existing count value in said counter means, in response to electrical control pulses applied to said counter means;

means for electrically coupling the other of said inputs with said counter means for actuating said value accessing and substituting operation in response to electrical pulses in said other input; and means electrically coupled with said counter means for sensing the count value in said counter means as the basis for providing said output.

15. The invention as set forth in claim 14, wherein:
said counter means includes a plurality of electrical bit state terminals presenting electrical signals whose states together represent the count value in said counter means in binary numeric form.

16. The invention as set forth in claim 15, wherein there is provided:
means electrically coupled with said terminals for translating said bit states of said signals at the latter into an electrical output in the form of a pulse signal in which the timing of pulses is dependent upon said bit states.

* * * * *